United States Patent
Nanu et al.

(10) Patent No.: US 8,081,254 B2
(45) Date of Patent: Dec. 20, 2011

(54) IN-CAMERA BASED METHOD OF DETECTING DEFECT EYE WITH HIGH ACCURACY

(75) Inventors: Florin Nanu, Bucharest (RO); Peter Corcoran, Claregalway (IE)

(73) Assignee: DigitalOptics Corporation Europe Limited, Galway (IE)

( * ) Notice: Subject to any disclaimer, the term of this patent is extended or adjusted under 35 U.S.C. 154(b) by 738 days.

(21) Appl. No.: 12/191,304

(22) Filed: Aug. 14, 2008

(65) Prior Publication Data

US 2010/0039520 A1  Feb. 18, 2010

(51) Int. Cl.
*H04N 5/222* (2006.01)
*H04N 5/235* (2006.01)

(52) U.S. Cl. .................... 348/370; 348/371; 348/363

(58) Field of Classification Search .................. 348/240, 348/362, 367, 373, 370; 396/88, 155, 157, 396/158, 161, 177
See application file for complete search history.

(56) References Cited

U.S. PATENT DOCUMENTS

| | | |
|---|---|---|
| 4,285,588 A | 8/1981 | Mir |
| 4,577,219 A | 3/1986 | Klie et al. |
| 4,646,134 A | 2/1987 | Komatsu et al. |
| 4,777,620 A | 10/1988 | Shimoni et al. |
| 4,881,067 A | 11/1989 | Watanabe et al. |
| 4,978,989 A | 12/1990 | Nakano et al. |
| 5,016,107 A | 5/1991 | Sasson et al. |
| 5,070,355 A | 12/1991 | Inoue et al. |
| 5,130,789 A | 7/1992 | Dobbs et al. |
| 5,164,831 A | 11/1992 | Kuchta et al. |
| 5,164,833 A | 11/1992 | Aoki |
| 5,202,720 A | 4/1993 | Fujino et al. |
| 5,231,674 A | 7/1993 | Cleveland et al. |
| 5,249,053 A | 9/1993 | Jain |
| 5,274,457 A | 12/1993 | Kobayashi et al. |
| 5,301,026 A | 4/1994 | Lee |
| 5,303,049 A | 4/1994 | Ejima et al. |
| 5,335,072 A | 8/1994 | Tanaka et al. |
| 5,384,601 A | 1/1995 | Yamashita et al. |
| 5,400,113 A | 3/1995 | Sosa et al. |
| 5,432,863 A | 7/1995 | Benati et al. |
| 5,432,866 A | 7/1995 | Sakamoto |
| 5,452,048 A | 9/1995 | Edgar |
| 5,455,606 A | 10/1995 | Keeling et al. |

(Continued)

FOREIGN PATENT DOCUMENTS

EP   884694 A1   12/1998

(Continued)

OTHER PUBLICATIONS

Agrawal A. et al., "Removing photography artifacts using gradient projection and flash-exposure sampling" ACM Transactions on Graphics, 2005, pp. 828-835.

(Continued)

*Primary Examiner* — Sinh Tran
*Assistant Examiner* — Selam Gebriel
(74) *Attorney, Agent, or Firm* — Andrew V. Smith

(57) ABSTRACT

A portable digital image acquisition device includes multiple lenses and/or multiple flashes. A main digital image and first and second reference images are acquired. The first and second reference images are acquired with different flash-lens combinations that have different flash-lens distances. One or more flash eye defects are detected and corrected in the main image based on analysis of the first and second reference images.

39 Claims, 4 Drawing Sheets

U.S. PATENT DOCUMENTS

| | | |
|---|---|---|
| 5,537,516 A | 7/1996 | Sherman et al. |
| 5,568,187 A | 10/1996 | Okino |
| 5,568,194 A | 10/1996 | Abe |
| 5,649,238 A | 7/1997 | Wakabayashi et al. |
| 5,671,013 A | 9/1997 | Nakao |
| 5,678,073 A | 10/1997 | Stephenson, III et al. |
| 5,694,926 A | 12/1997 | DeVries et al. |
| 5,708,866 A | 1/1998 | Leonard |
| 5,719,639 A | 2/1998 | Imamura |
| 5,719,951 A | 2/1998 | Shackleton et al. |
| 5,724,456 A | 3/1998 | Boyack et al. |
| 5,734,425 A | 3/1998 | Takizawa et al. |
| 5,748,764 A | 5/1998 | Benati et al. |
| 5,748,784 A | 5/1998 | Sugiyama |
| 5,751,836 A | 5/1998 | Wildes et al. |
| 5,761,550 A | 6/1998 | Kancigor |
| 5,781,650 A | 7/1998 | Lobo et al. |
| 5,805,720 A | 9/1998 | Suenaga et al. |
| 5,805,727 A | 9/1998 | Nakano |
| 5,805,745 A | 9/1998 | Graf |
| 5,815,749 A | 9/1998 | Tsukahara et al. |
| 5,818,975 A | 10/1998 | Goodwin et al. |
| 5,847,714 A | 12/1998 | Naqvi et al. |
| 5,850,470 A | 12/1998 | Kung et al. |
| 5,862,217 A | 1/1999 | Steinberg et al. |
| 5,862,218 A | 1/1999 | Steinberg |
| 5,892,837 A | 4/1999 | Luo et al. |
| 5,949,904 A | 9/1999 | Delp |
| 5,974,189 A | 10/1999 | Nicponski |
| 5,990,973 A | 11/1999 | Sakamoto |
| 5,991,456 A | 11/1999 | Rahman et al. |
| 5,991,549 A | 11/1999 | Tsuchida |
| 5,991,594 A | 11/1999 | Froeber et al. |
| 5,999,160 A | 12/1999 | Kitamura et al. |
| 6,006,039 A | 12/1999 | Steinberg et al. |
| 6,009,209 A | 12/1999 | Acker et al. |
| 6,011,547 A | 1/2000 | Shiota et al. |
| 6,016,354 A | 1/2000 | Lin et al. |
| 6,028,611 A | 2/2000 | Anderson et al. |
| 6,035,072 A | 3/2000 | Read |
| 6,035,074 A | 3/2000 | Fujimoto et al. |
| 6,036,072 A | 3/2000 | Lee |
| 6,101,271 A | 8/2000 | Yamashita et al. |
| 6,104,839 A | 8/2000 | Cok et al. |
| 6,118,485 A | 9/2000 | Hinoue et al. |
| 6,134,339 A | 10/2000 | Luo |
| 6,151,403 A | 11/2000 | Luo |
| 6,172,706 B1 | 1/2001 | Tatsumi |
| 6,192,149 B1 | 2/2001 | Eschbach et al. |
| 6,195,127 B1 | 2/2001 | Sugimoto |
| 6,201,571 B1 | 3/2001 | Ota |
| 6,204,858 B1 | 3/2001 | Gupta |
| 6,233,364 B1 | 5/2001 | Krainiouk et al. |
| 6,249,315 B1 | 6/2001 | Holm |
| 6,252,976 B1 | 6/2001 | Schildkraut et al. |
| 6,266,054 B1 | 7/2001 | Lawton et al. |
| 6,268,939 B1 | 7/2001 | Klassen et al. |
| 6,275,614 B1 | 8/2001 | Krishnamurthy et al. |
| 6,278,491 B1 | 8/2001 | Wang et al. |
| 6,285,410 B1 | 9/2001 | Marni |
| 6,292,574 B1 | 9/2001 | Schildkraut et al. |
| 6,295,378 B1 | 9/2001 | Kitakado et al. |
| 6,298,166 B1 | 10/2001 | Ratnakar et al. |
| 6,300,935 B1 | 10/2001 | Sobel et al. |
| 6,381,345 B1 | 4/2002 | Swain |
| 6,393,148 B1 | 5/2002 | Bhaskar |
| 6,396,963 B2 | 5/2002 | Shaffer et al. |
| 6,407,777 B1 | 6/2002 | DeLuca |
| 6,421,468 B1 | 7/2002 | Ratnakar et al. |
| 6,426,775 B1 | 7/2002 | Kurokawa |
| 6,429,924 B1 | 8/2002 | Milch |
| 6,433,818 B1 | 8/2002 | Steinberg et al. |
| 6,438,264 B1 | 8/2002 | Gallagher et al. |
| 6,441,854 B2 | 8/2002 | Fellegara et al. |
| 6,459,436 B1 | 10/2002 | Kumada et al. |
| 6,473,199 B1 | 10/2002 | Gilman et al. |
| 6,496,655 B1 | 12/2002 | Malloy Desormeaux |
| 6,501,911 B1 | 12/2002 | Malloy Desormeaux |
| 6,505,003 B1 | 1/2003 | Malloy Desormeaux |
| 6,510,520 B1 | 1/2003 | Steinberg |
| 6,516,154 B1 | 2/2003 | Parulski et al. |
| 6,614,471 B1 | 9/2003 | Ott |
| 6,614,995 B2 | 9/2003 | Tseng |
| 6,621,867 B1 | 9/2003 | Sazzad et al. |
| 6,628,833 B1 | 9/2003 | Horie |
| 6,700,614 B1 | 3/2004 | Hata |
| 6,707,950 B1 | 3/2004 | Burns et al. |
| 6,714,665 B1 | 3/2004 | Hanna et al. |
| 6,718,051 B1 | 4/2004 | Eschbach |
| 6,724,941 B1 | 4/2004 | Aoyama |
| 6,728,401 B1 | 4/2004 | Hardeberg |
| 6,734,911 B1 * | 5/2004 | Lyons ........................... 348/340 |
| 6,765,686 B2 | 7/2004 | Maruoka |
| 6,786,655 B2 | 9/2004 | Cook et al. |
| 6,792,161 B1 | 9/2004 | Imaizumi et al. |
| 6,798,913 B2 | 9/2004 | Toriyama |
| 6,859,565 B2 | 2/2005 | Baron |
| 6,873,743 B2 | 3/2005 | Steinberg |
| 6,885,766 B2 | 4/2005 | Held et al. |
| 6,895,112 B2 | 5/2005 | Chen et al. |
| 6,900,882 B2 | 5/2005 | Iida |
| 6,912,298 B1 | 6/2005 | Wilensky |
| 6,937,997 B1 | 8/2005 | Parulski |
| 6,967,680 B1 | 11/2005 | Kagle et al. |
| 6,980,691 B2 | 12/2005 | Nesterov et al. |
| 6,984,039 B2 | 1/2006 | Agostinelli |
| 7,024,051 B2 | 4/2006 | Miller et al. |
| 7,027,662 B2 | 4/2006 | Baron |
| 7,030,927 B2 | 4/2006 | Sasaki |
| 7,035,461 B2 | 4/2006 | Luo et al. |
| 7,035,462 B2 | 4/2006 | White et al. |
| 7,042,501 B1 | 5/2006 | Matama |
| 7,042,505 B1 | 5/2006 | DeLuca |
| 7,062,086 B2 | 6/2006 | Chen et al. |
| 7,116,820 B2 | 10/2006 | Luo et al. |
| 7,133,070 B2 | 11/2006 | Wheeler et al. |
| 7,155,058 B2 | 12/2006 | Gaubatz et al. |
| 7,171,044 B2 | 1/2007 | Chen et al. |
| 7,216,289 B2 | 5/2007 | Kagle et al. |
| 7,224,850 B2 | 5/2007 | Zhang et al. |
| 7,269,292 B2 | 9/2007 | Steinberg |
| 7,289,664 B2 | 10/2007 | Enomoto |
| 7,295,233 B2 | 11/2007 | Steinberg et al. |
| 7,310,443 B1 | 12/2007 | Kris et al. |
| 7,315,631 B1 | 1/2008 | Corcoran et al. |
| 7,336,821 B2 | 2/2008 | Ciuc et al. |
| 7,352,394 B1 | 4/2008 | DeLuca et al. |
| 7,362,368 B2 | 4/2008 | Steinberg et al. |
| 7,369,712 B2 | 5/2008 | Steinberg et al. |
| 7,403,643 B2 | 7/2008 | Ianculescu et al. |
| 7,436,998 B2 | 10/2008 | Steinberg et al. |
| 7,454,040 B2 | 11/2008 | Luo et al. |
| 7,515,740 B2 | 4/2009 | Corcoran et al. |
| 7,819,525 B2 * | 10/2010 | Connell, II .................... 351/204 |
| 2001/0015760 A1 | 8/2001 | Fellegara et al. |
| 2001/0031142 A1 | 10/2001 | Whiteside |
| 2001/0052937 A1 | 12/2001 | Suzuki |
| 2002/0019859 A1 | 2/2002 | Watanabe |
| 2002/0041329 A1 | 4/2002 | Steinberg |
| 2002/0051571 A1 | 5/2002 | Jackway et al. |
| 2002/0054224 A1 | 5/2002 | Wasula et al. |
| 2002/0085088 A1 | 7/2002 | Eubanks |
| 2002/0090133 A1 | 7/2002 | Kim et al. |
| 2002/0093577 A1 | 7/2002 | Kitawaki et al. |
| 2002/0093633 A1 | 7/2002 | Milch |
| 2002/0105662 A1 | 8/2002 | Patton et al. |
| 2002/0114513 A1 | 8/2002 | Hirao |
| 2002/0126893 A1 | 9/2002 | Held et al. |
| 2002/0131770 A1 | 9/2002 | Meier et al. |
| 2002/0136450 A1 | 9/2002 | Chen et al. |
| 2002/0141661 A1 | 10/2002 | Steinberg |
| 2002/0150306 A1 | 10/2002 | Baron |
| 2002/0159630 A1 | 10/2002 | Buzuloiu et al. |
| 2002/0172419 A1 | 11/2002 | Lin et al. |
| 2002/0176623 A1 | 11/2002 | Steinberg |
| 2003/0007687 A1 | 1/2003 | Nesterov et al. |
| 2003/0021478 A1 | 1/2003 | Yoshida |

| Publication No. | Date | Inventor |
|---|---|---|
| 2003/0025808 A1 | 2/2003 | Parulski et al. |
| 2003/0025811 A1 | 2/2003 | Keelan et al. |
| 2003/0044063 A1 | 3/2003 | Meckes et al. |
| 2003/0044070 A1 | 3/2003 | Fuersich et al. |
| 2003/0044176 A1 | 3/2003 | Saitoh |
| 2003/0044177 A1 | 3/2003 | Oberhardt et al. |
| 2003/0044178 A1 | 3/2003 | Oberhardt et al. |
| 2003/0052991 A1 | 3/2003 | Stavely et al. |
| 2003/0058343 A1 | 3/2003 | Katayama |
| 2003/0058349 A1 | 3/2003 | Takemoto |
| 2003/0095197 A1 | 5/2003 | Wheeler et al. |
| 2003/0107649 A1 | 6/2003 | Flickner et al. |
| 2003/0113035 A1 | 6/2003 | Cahill et al. |
| 2003/0118216 A1 | 6/2003 | Goldberg |
| 2003/0118217 A1* | 6/2003 | Kondo et al. ............. 382/117 |
| 2003/0137597 A1 | 7/2003 | Sakamoto et al. |
| 2003/0142285 A1 | 7/2003 | Enomoto |
| 2003/0161506 A1 | 8/2003 | Velazquez et al. |
| 2003/0190072 A1 | 10/2003 | Adkins et al. |
| 2003/0194143 A1 | 10/2003 | Iida |
| 2003/0202715 A1 | 10/2003 | Kinjo |
| 2004/0017481 A1 | 1/2004 | Takasumi et al. |
| 2004/0027593 A1 | 2/2004 | Wilkins |
| 2004/0032512 A1 | 2/2004 | Silverbrook |
| 2004/0032526 A1 | 2/2004 | Silverbrook |
| 2004/0033071 A1 | 2/2004 | Kubo |
| 2004/0037460 A1 | 2/2004 | Luo et al. |
| 2004/0046878 A1 | 3/2004 | Jarman |
| 2004/0047491 A1 | 3/2004 | Rydbeck |
| 2004/0056975 A1 | 3/2004 | Hata |
| 2004/0057622 A1* | 3/2004 | Bradski ............. 382/217 |
| 2004/0057623 A1 | 3/2004 | Schuhrke et al. |
| 2004/0057705 A1 | 3/2004 | Kohno |
| 2004/0057715 A1 | 3/2004 | Tsuchida et al. |
| 2004/0090461 A1 | 5/2004 | Adams |
| 2004/0093432 A1 | 5/2004 | Luo et al. |
| 2004/0114796 A1 | 6/2004 | Kaku |
| 2004/0114797 A1 | 6/2004 | Meckes |
| 2004/0114829 A1 | 6/2004 | LeFeuvre et al. |
| 2004/0114904 A1 | 6/2004 | Sun et al. |
| 2004/0119851 A1 | 6/2004 | Kaku |
| 2004/0120598 A1 | 6/2004 | Feng |
| 2004/0125387 A1 | 7/2004 | Nagao et al. |
| 2004/0126086 A1 | 7/2004 | Nakamura et al. |
| 2004/0141657 A1 | 7/2004 | Jarman |
| 2004/0150743 A1 | 8/2004 | Schinner |
| 2004/0160517 A1 | 8/2004 | Iida |
| 2004/0165215 A1 | 8/2004 | Raguet et al. |
| 2004/0170304 A1* | 9/2004 | Haven et al. ............. 382/115 |
| 2004/0184044 A1 | 9/2004 | Kolb et al. |
| 2004/0184670 A1 | 9/2004 | Jarman et al. |
| 2004/0196292 A1 | 10/2004 | Okamura |
| 2004/0196503 A1 | 10/2004 | Kurtenbach et al. |
| 2004/0213476 A1 | 10/2004 | Luo et al. |
| 2004/0223063 A1 | 11/2004 | DeLuca et al. |
| 2004/0227978 A1 | 11/2004 | Enomoto |
| 2004/0228542 A1 | 11/2004 | Zhang et al. |
| 2004/0233299 A1 | 11/2004 | Ioffe et al. |
| 2004/0233301 A1 | 11/2004 | Nakata et al. |
| 2004/0234156 A1 | 11/2004 | Watanabe et al. |
| 2004/0239779 A1 | 12/2004 | Washisu |
| 2004/0240747 A1 | 12/2004 | Jarman et al. |
| 2004/0258308 A1 | 12/2004 | Sadovsky et al. |
| 2005/0001024 A1 | 1/2005 | Kusaka et al. |
| 2005/0013602 A1 | 1/2005 | Ogawa |
| 2005/0013603 A1 | 1/2005 | Ichimasa |
| 2005/0024498 A1 | 2/2005 | Iida et al. |
| 2005/0031224 A1 | 2/2005 | Prilutsky et al. |
| 2005/0041121 A1 | 2/2005 | Steinberg et al. |
| 2005/0046730 A1 | 3/2005 | Li |
| 2005/0047655 A1 | 3/2005 | Luo et al. |
| 2005/0047656 A1 | 3/2005 | Luo et al. |
| 2005/0053279 A1 | 3/2005 | Chen et al. |
| 2005/0058340 A1 | 3/2005 | Chen et al. |
| 2005/0058342 A1 | 3/2005 | Chen et al. |
| 2005/0062856 A1 | 3/2005 | Matsushita |
| 2005/0063083 A1 | 3/2005 | Dart et al. |
| 2005/0068452 A1 | 3/2005 | Steinberg et al. |
| 2005/0074164 A1 | 4/2005 | Yonaha |
| 2005/0074179 A1 | 4/2005 | Wilensky |
| 2005/0078191 A1 | 4/2005 | Battles |
| 2005/0117132 A1 | 6/2005 | Agostinelli |
| 2005/0129331 A1 | 6/2005 | Kakiuchi et al. |
| 2005/0134719 A1 | 6/2005 | Beck |
| 2005/0140801 A1 | 6/2005 | Prilutsky et al. |
| 2005/0147278 A1 | 7/2005 | Rui et al. |
| 2005/0151943 A1 | 7/2005 | Iida |
| 2005/0163498 A1 | 7/2005 | Battles et al. |
| 2005/0168965 A1 | 8/2005 | Yoshida |
| 2005/0196067 A1 | 9/2005 | Gallagher et al. |
| 2005/0199783 A1* | 9/2005 | Wenstrand et al. ....... 250/214.1 |
| 2005/0200736 A1 | 9/2005 | Ito |
| 2005/0207649 A1 | 9/2005 | Enomoto et al. |
| 2005/0212955 A1 | 9/2005 | Craig et al. |
| 2005/0219385 A1 | 10/2005 | Terakawa |
| 2005/0219608 A1 | 10/2005 | Wada |
| 2005/0220346 A1 | 10/2005 | Akahori |
| 2005/0220347 A1 | 10/2005 | Enomoto et al. |
| 2005/0226499 A1 | 10/2005 | Terakawa |
| 2005/0232490 A1 | 10/2005 | Itagaki et al. |
| 2005/0238230 A1 | 10/2005 | Yoshida |
| 2005/0243348 A1 | 11/2005 | Yonaha |
| 2005/0275734 A1 | 12/2005 | Ikeda |
| 2005/0276481 A1 | 12/2005 | Enomoto |
| 2005/0280717 A1 | 12/2005 | Sugimoto |
| 2005/0286766 A1 | 12/2005 | Ferman |
| 2006/0008171 A1 | 1/2006 | Petschnigg et al. |
| 2006/0017825 A1 | 1/2006 | Thakur |
| 2006/0038916 A1 | 2/2006 | Knoedgen et al. |
| 2006/0039690 A1 | 2/2006 | Steinberg et al. |
| 2006/0045352 A1 | 3/2006 | Gallagher |
| 2006/0050300 A1 | 3/2006 | Mitani et al. |
| 2006/0066628 A1 | 3/2006 | Brodie et al. |
| 2006/0082847 A1 | 4/2006 | Sugimoto |
| 2006/0093212 A1 | 5/2006 | Steinberg et al. |
| 2006/0093213 A1 | 5/2006 | Steinberg et al. |
| 2006/0093238 A1 | 5/2006 | Steinberg et al. |
| 2006/0098867 A1 | 5/2006 | Gallagher |
| 2006/0098875 A1 | 5/2006 | Sugimoto |
| 2006/0119832 A1 | 6/2006 | Iida |
| 2006/0120599 A1 | 6/2006 | Steinberg et al. |
| 2006/0140455 A1 | 6/2006 | Costache et al. |
| 2006/0150089 A1 | 7/2006 | Jensen et al. |
| 2006/0203108 A1 | 9/2006 | Steinberg et al. |
| 2006/0204052 A1 | 9/2006 | Yokouchi |
| 2006/0204110 A1 | 9/2006 | Steinberg et al. |
| 2006/0221408 A1 | 10/2006 | Fukuda |
| 2006/0285754 A1 | 12/2006 | Steinberg et al. |
| 2007/0110305 A1 | 5/2007 | Corcoran et al. |
| 2007/0116379 A1 | 5/2007 | Corcoran et al. |
| 2007/0116380 A1 | 5/2007 | Ciuc et al. |
| 2007/0133863 A1 | 6/2007 | Sakai et al. |
| 2007/0154189 A1 | 7/2007 | Harradine et al. |
| 2007/0201724 A1 | 8/2007 | Steinberg et al. |
| 2007/0263104 A1 | 11/2007 | DeLuca et al. |
| 2007/0263928 A1 | 11/2007 | Akahori |
| 2008/0002060 A1 | 1/2008 | DeLuca et al. |
| 2008/0013798 A1 | 1/2008 | Ionita et al. |
| 2008/0043121 A1 | 2/2008 | Prilutsky et al. |
| 2008/0112599 A1 | 5/2008 | Nanu et al. |
| 2008/0144965 A1 | 6/2008 | Steinberg et al. |
| 2008/0186389 A1 | 8/2008 | DeLuca et al. |
| 2008/0211937 A1 | 9/2008 | Steinberg et al. |
| 2008/0232711 A1 | 9/2008 | Prilutsky et al. |
| 2008/0240555 A1 | 10/2008 | Nanu et al. |

FOREIGN PATENT DOCUMENTS

| | | |
|---|---|---|
| EP | 911759 A2 | 4/1999 |
| EP | 911759 A3 | 6/2000 |
| EP | 1199672 A2 | 4/2002 |
| EP | 1229486 A1 | 8/2002 |
| EP | 1288858 A1 | 3/2003 |
| EP | 1288859 A1 | 3/2003 |
| EP | 1288860 A1 | 3/2003 |
| EP | 1293933 A1 | 3/2003 |
| EP | 1296510 A2 | 3/2003 |
| EP | 1429290 A2 | 6/2004 |
| EP | 1478169 A2 | 11/2004 |

| | | | |
|---|---|---|---|
| EP | 1528509 A2 | 5/2005 |
| EP | 979487 B1 | 3/2006 |
| EP | 1429290 B1 | 7/2008 |
| GB | 841609 A | 7/1960 |
| JP | 4192681 A2 | 7/1992 |
| JP | 5224271 A2 | 9/1993 |
| JP | 9214839 A2 | 8/1997 |
| JP | 20134486 A2 | 5/2000 |
| JP | 22247596 A2 | 8/2002 |
| JP | 22271808 A2 | 9/2002 |
| JP | 2003-030647 A2 | 1/2003 |
| WO | WO-9802844 A1 | 1/1998 |
| WO | WO-9917254 A1 | 4/1999 |
| WO | WO-9933684 A2 | 7/1999 |
| WO | WO-0171421 A1 | 9/2001 |
| WO | WO-0192614 A1 | 12/2001 |
| WO | WO-0245003 A1 | 6/2002 |
| WO | WO-03026278 A1 | 3/2003 |
| WO | WO-03071484 A1 | 8/2003 |
| WO | WO-2004034696 A1 | 4/2004 |
| WO | WO-2005015896 A1 | 2/2005 |
| WO | WO-2005041558 A1 | 5/2005 |
| WO | WO-2005076217 A2 | 8/2005 |
| WO | WO-2005076217 A3 | 8/2005 |
| WO | WO-2005087994 A1 | 9/2005 |
| WO | WO-2005109853 A1 | 11/2005 |
| WO | WO-2006011635 A1 | 2/2006 |
| WO | WO-2006018056 A1 | 2/2006 |
| WO | WO-2006045441 A1 | 5/2006 |
| WO | WO-2007057063 A1 | 5/2007 |
| WO | WO-2007057064 A1 | 5/2007 |
| WO | WO-2007093199 A2 | 8/2007 |
| WO | WO-2007093199 A3 | 8/2007 |
| WO | WO-2007095553 A2 | 8/2007 |
| WO | WO-2007095553 A3 | 8/2007 |
| WO | WO-2007142621 A1 | 12/2007 |
| WO | WO-2008023280 A2 | 2/2008 |
| WO | WO-2008109644 A2 | 9/2008 |
| WO | WO-2008109644 A3 | 9/2008 |

OTHER PUBLICATIONS

Co-pending Appl. No. PCT/EP2009/005809.
Co-pending Appl. No. PCT/EP2009/006361.
Final Office Action mailed Nov. 20, 2009, for U.S. Appl. No. 12/192,897, filed Aug. 15, 2008.
Final Office Action mailed Sep. 1, 2009, for U.S. Appl. No. 11/841,855, filed Aug. 20, 2007.
Non-Final Office Action mailed Aug. 31, 2009, for U.S. Appl. No. 11/462,035, filed Aug. 2, 2006.
Non-Final Office Action mailed Jul. 14, 2009, for U.S. Appl. No. 12/192,897, filed Aug. 15, 2008.
Non-Final Office Action mailed Oct. 5, 2009, for U.S. Appl. No. 10/919,226, filed Aug. 16, 2004.
Non-Final Office Action mailed Oct. 7, 2009, for U.S. Appl. No. 12/119,614, filed May 13, 2008.
Non-Final Office Action mailed Oct. 29, 2009, for U.S. Appl. No. 12/194,148, filed Aug. 19, 2008.
PCT Notification of Transmittal of the International Search Report and the Written Opinion of the International Searching Authority, or the Declaration, for PCT Application No. PCT/EP2009/005809, dated Nov. 24, 2009, 12 pages.
PCT Notification of Transmittal of the International Search Report and the Written Opinion of the International Searching Authority, or the Declaration, for PCT Application No. PCT/EP2009/006361, dated Nov. 24, 2009, 10 pages.
PCT Partial International Search Report for Application No. PCT/EP2009/051081, dated Apr. 29, 2009, 7 pages.
Translation of Hiroshi et al. JP05-224271, Mar. 1993, Japan Publication.
Combier, Nathalie et al., "Removal of Defects on Flash Radiographic Images by Fuzzy Combination, Conference: Machine Vision Applications in Industrial Inspection III, http://rlinks2.dialog.com/NASApp/ChannelWEB/DialogProServlet?ChName=engineering", SPIE—The Intl Society for Optical Engrg, Society of Photo-Optical Instrumentation, 1995, pp. 301-312.

Corcoran, P. et al., "Automated In-Camera Detection of Flash-Eye Defects", IEEE Transactions on Consumer Electronics, 2005, pp. 11-17, vol. 51—Issue 1.
Cucchiara, R. et al., "Detection of Luminosity Profiles of Elongated Shapes", International Conference on Image Processing, 1996, pp. 635-638, vol. 3.
EPO Communication pursuant to Article 94(3) EPC, for European Patentr Application No. 05 792 584.4, paper dated May 13, 2008. 8 pages.
European Patent Office, Communication pursuant to Article 94(3) EPC for Application No. 04763763.2, dated Mar. 7, 2008, 7 pages.
European Patent Office, Communication pursuant to Article 96(2) EPC for Application No. 04763763.2, dated Aug. 29, 2006, 4 pages.
Gaubatz, Matthew et al., "Automatic Red-Eye Detection and Correction", IEEE ICIP, Proceedings 2002 Intl. Conference on Image Processing, 2002. pp. 1-804-1-807, vol. 2—Issue 3.
Han, T. et al., "Detection and Correction of abnormal Pixels in Hyperion Images", IEEE International Symposium on Geoscience and Remote Sensing, 2002, pp. 1327-1330, vol. 3.
Iivarinen, J. et al., "Content-Based Retrieval of Defect Images, http://www.cs.tut.fi/.about.avisa/digger/Publications/acivs02.pdf", Proceedings of Advanced Concepts for Intelligent Vision, Laboratory of Computer Information Science, 2002.
Ioffe, S., "Red eye detection with machine learning", Proceedings 2003 International Conference on Image Processing, 2003, pp. 871-874, vol. 2—Issue 3.
Ito, M., "An Automated System for LSI Fine Pattern Inspection Based on Comparison of Sem Images and Cad Data", IEEE Intl. Conference on Robotics and Automation, 1995, pp. 544-549, VI.
Jianhong Shen, "Inpainting and the Fundamental Problem of Image Processing", 2002, 6 pages.
Jin, B. et al., "Modeling and Analysis of Soft-Test/Repair for CCD-Based Digital X-Ray Systems", Instrumentation and Measurement, IEEE Trans., 2003, pp. 1713-1721, vol. 52—Issue 6.
Nguyen, Karlene et al., "Differences in the Infrared Bright Pupil Response of Human Eyes". Proceedings of the 2002 symposium on Eye tracking research and applications, 2002, pp. 133-138.
Patent Abstracts of Japan, publication No. 2000050062, Image Input Device, application No. 10-217124, published Feb. 18, 2000, 1 page.
PCT International Preliminary Report on Patentability (IPRP) for PCT Application PCT/EP2005/011010, dated Jan. 23, 2007, 18 pages.
PCT International Preliminary Report on Patentability for PCT Application No. PCT/EP2005/005907, dated Nov. 16, 2006, 8 pages.
PCT International Preliminary Report on Patentability for PCT Application No. PCT/EP2005/011010, dated Jan. 26, 2007, 18 pages.
PCT International Preliminary Report on Patentability for PCT Application PCT/EP2004/008706, dated Feb. 6, 2006, 7 pages.
PCT International Preliminary Report on Patentability for PCT Application PCT/EP2004/010199, dated Apr. 3, 2006, 7 pages.
PCT International Search Report and the Written Opinion of the International Searching Authority, or the Declaration, for PCT Application No. PCT/US2008/055864, dated Jul. 30, 2008, 8 pages.
PCT International Search Report and Written Opinion of the International Searching Authority for PCT Application No. PCT/EP2004/008706, dated Nov. 19, 2004, 13 pages.
PCT International Search Report and Written Opinion of the International Searching Authority for PCT Application No. PCT/EP2005/005033.
PCT Notification Concerning Transmittal of International Preliminary Report on Patentability, for PCT Application No. PCT/US2007/062090, dated Aug. 28, 2008, 6 pages.
PCT Notification of Transmittal of the International Search Report and the Written Opinion of the International Searching Authority, or the Declaration (PCT/EP2006/008342), dated Dec. 28, 2006.
PCT Notification of Transmittal of the International Search Report and the Written Opinion of the International Searching Authority, or the Declaration for PCT Application No. PCT/US07/62090 issued Mar. 10, 2008, 10 pages.
PCT Notification of Transmittal of the International Search Report and the Written Opinion of the International Searching Authority, or the Declaration for PCT/EP/2005/011010, dated Jan. 23, 2006, 14 pages.

PCT Notification of Transmittal of the International Search Report and the Written Opinion of the International Searching Authority, or the Declaration for PCT/EP/2005/05907, dated Aug. 1, 2005, 12 pages.

PCT Notification of Transmittal of the International Search Report and the Written Opinion of the International Searching Authority, or the Declaration, for PCT Application No. PCT/EP2006/008358, Dec. 5, 2006, 14 pages.

PCT Notification of Transmittal of the International Search Report and the Written Opinion of the International Searching Authority, or the Declaration, for PCT Application No. PCT/EP2006/008358, filed Aug. 8, 2006.

PCT Notification of Transmittal of the International Search Report and the Written Opinion of the International Searching Authority, or the Declaration, for PCT Application No. PCT/US2008/055964, paper dated Jul. 30, 2008, 8 Pages.

PCT Notification of Transmittal of the International Search Report and Written Opinion of the International Searching Authority for PCT Application No. PCT/EP2005/001171, (11 pages).

PCT Written Opinion of the Intl. Searching Authority, for PCT app. No. PCT/EP/2005/011010, dated Jan. 19, 2006, 7 pages.

PCT Written Opinion of the Intl. Searching Authority, PCT app. No. PCT/EP2004/008706, 4 pages.

PCT Written Opinion of the International Searching Authority, PCT application No. PCT/EP2004/008706, dated Nov. 17, 2004, 6 pages.

PCT Written Opinion of the International Searching Authority, PCT application No. PCT/EP2004/010199, dated Dec. 9, 2004, 6 pages.

PCT Written Opinion of the International Searching Authority, PCT application No. PCT/EP2005/005907, dated Jul. 28, 2005, 7 pages.

Plotnikov, Yuri et al., "Advanced Image Processing for Defect Visualization in Infrared Thermography, http://citeseer.ist.psu.edu/plotnikov98advanced.html", NASA Langley Research Center, M.S. Posted: ACM Portal, 1998.

Plotnikov, Yuri et al., Winfree, "Visualization of Subsurface Defects in Composites Using a Focal Plane Array Infrared Camera, http://citeseer.ist.psu.edu/357066.html", NASA Langley Research Center, 1999.

Sahba, F. et al., "Filter Fusion for Image Enhancement Using Reinforcement Learning, XP010654204, ISBN: 0-7803-7781-8", Canadian Conference on Electrical and computer Engineering, 2003, pp. 847-850, vol. 3.

Smolka, B. et al., "Towards Automatic Redeye Effect Removal, XP004416063", Pattern Recognition Letters, 2003, pp. 1767-1785, vol. 24—Issue 11, North-Holland Publ.

Soriano, M. et al., "Making Saturated Facial Images Useful Again, XP002325961, ISSN: 0277-786X", Proceedings of The Spie, 1999, pp. 113-121, vol. 3826.

Tan, Yap-Peng et al., "Robust Sequential Approach for the Detection of Defective Pixels in an Image Sensor, http:// ieeexplorejeee.org/search/freesrchabstract.jsp?arnumber=758382Andisnumber=16342 andpunumber=6110andk2dockey=758382©ieeecnfsandquery=%28%28%28%28images+and+defects+and+correction%29%29%29%29+3%Cin%3E", IEEE Intl Conf on Acoustics, Speech, and Signal Processing, 1999, pp. 2239-2242, vol. 4.

Toet, A., "Multiscale Color Image Enhancement, Posted online: 200208-06 18:09:24.0 http://ieeexplore.ieee.org/search/freesrch abstract.jsp?arnumber=146865andisnumber=3917andpunumber=1197andk2dockey=146865©ieeecnfsandquery=%28%28images+and+defects+and+luminance%29%29+%3Cin%3E+metadataand pos=1", International Conference on Image Processing and its Applications, 1992, pp. 583-585.

U.S. Appl. No. 10/772,767, filed Feb. 4, 2004, by inventors Michael J. DeLuca, et al.

U.S. Appl. No. 10/170,511, filed Jun. 12, 2002, inventor Michael J. DeLuca.

U.S. Appl. No. 11/217,788, filed Aug. 30, 2005, inventors Eran Steinberg, et al.

United Kingdom Search Report dated May 22, 2007, issued in Application No. GB 0701957.3.

U.S. Appl. No. 11/217,278, filed Aug. 30, 2005. inventors Eran Steinberg, et al.

Willamowski, J. et al., "Probabilistic Automatic Red Eye Detection and Correction", The 18th International Conference on Pattern Recognition (ICPR'06), 2006. pp. 762-765, vol. 3. IEEE Computer Society.

* cited by examiner

IN-CAMERA BASED METHOD OF DETECTING DEFECT EYE WITH HIGH ACCURACY

BACKGROUND OF THE INVENTION

It is known to capture non-flash images followed by flash images and by subtracting these images (including some luminance normalizing), one can get a difference image which indicates where red-eye defects (flash-eyes) are located. U.S. Pat. Nos. 7,027,662 and 6,859,565 are incorporated by reference.

In addition, US published patent application 2005/0041121, entitled "Red-eye filter method and apparatus", which is assigned to the same assignee as the present application and incorporated by reference, describes techniques wherein a reference non-flash and the main flash image may initially be of different sizes, and where the images are sized to the same dimensions and aligned before luminance normalization and/or subtraction.

It is desired to have an improved technique involving capturing two images that are normalized for luminance and then subtracted, indicating the likely eye locations in a main acquired image, followed by acquisition of a main image. The process would be performed quickly (typically less than 1 second) to minimize any misalignment of the reference pair and the main acquired image.

It is also desired to have a technique that overcomes problems associated with the non-flash image tending to be significantly darker than the flash image and, particularly in indoor environments, wherein it is difficult to achieve practical luminance normalization.

SUMMARY OF THE INVENTION

A portable digital image acquisition device is provided. The device includes a lens and a sensor for acquiring a main digital image and first and second reference images. The device also includes first and second light sources disposed at different distances from the lens for illuminating one or more objects within an acquired scene. The main image is stored in a memory. The device also includes one or more processor-readable media having digital code embedded therein for programming a processor to perform a method of determining and correcting a flash eye defect in the main digital image using the first and second reference images. The method includes acquiring the first and second reference images respectively using the first and second light sources. The first and second images are normalized to generate normalized first and second reference images. One or more differences between the first and second normalized reference images are analyzed. The method further includes determining and correcting the flash eye defect within the main image based on the analyzing to generate a corrected main image. The corrected main image or a further processed version is stored, transmitted, communicated, displayed, and/or projected.

Another portable digital image acquisition device is provided. This device includes first and second lenses and at least one sensor for acquiring a main digital image and first and second reference images. The device also includes a light source disposed at different distances from the first and second lenses respectively for illuminating one or more objects within an acquired scene. The main digital image and/or a further processed version is stored in a memory. The device includes one or more processor-readable media having digital code embedded therein for programming a processor to perform a method of determining and correcting a flash eye defect in the main digital image using the first and second reference images. The method includes acquiring the first and second reference images using the light source and the first and second lenses respectively. The first and second images are normalized to generate normalized first and second reference images. One or more differences between the first and second normalized reference images are analyzed. The method further includes determining and correcting the flash eye defect within the main image based on the analyzing to generate a corrected main image. The corrected main image and/or further processed version is stored, transmitted, communicated, displayed, and/or projected.

In either device, the analyzing may include subtracting the first and second reference images.

The normalizing may include luminance normalizing.

The flash eye defect may include a red eye defect.

The normalizing may include re-sizing one or both of the first and second reference images.

The normalizing may include aligning the first and second reference images. The aligning may include aligning one or more eyes within the first and second images.

The differences may include color differences and/or brightness differences.

The first and second reference images may be each acquired using relatively low-intensity pre-flashes compared with an intensity of a flash used in acquiring the main digital image.

The analyzing may take into account the specific different distances between the first and second light sources and the lens in the first device, or between the first and second lenses and the light source in the second device.

The analyzing may further take into account distance to one or more objects, a gaze angle, an ambient lighting condition, color of an iris and/or a skin tone of a face within the acquired scene.

The first and second preview images may be acquired consecutively prior to acquiring the main digital image.

Methods determining and correcting a flash eye defect in the main digital image using the first and second reference images are also provided. Computer readable media having embedded code for programming a processor to perform the methods are also provided.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE EMBODIMENTS

It is recognized herein that if a light source is located at a different spatial distance from an imaging lens, the color and brightness of eye regions in the image can vary significantly. At the same time, the remainder of the image will not vary as much in color and brightness.

Figure 1A:
FIG. 1A illustrates a camera with a flash close to an optical lens for acquiring an image.
Figure 1B:
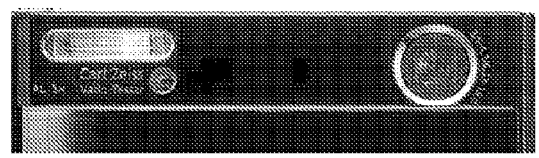
FIG. 1B illustrates a camera with a flash farther from an optical lens than the flash illustrated in FIG. 1A.
Figure 2A:
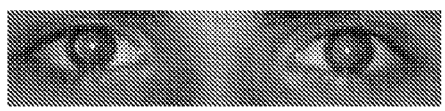
FIGS. 2A, 3A and 4A illustrate flash eye defects in digital images acquired with the camera of FIG. 1A.
Figure 2B:
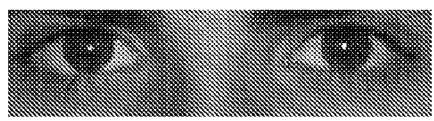
FIGS. 2B, 3B and 4B illustrate flash eye defects in digital images acquired with the camera of FIG. 1B.
Figure 3A:
Figure 3B:
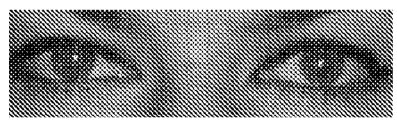
Figure 4A:
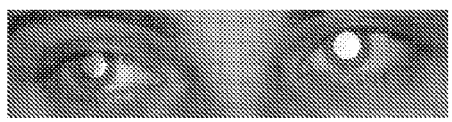
Figure 4B:
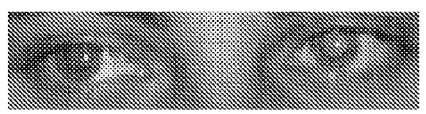

FIGS. 1A and 1B illustrate two cameras each having a single flash and a single lens. However, the flash-lens distance is greater for the camera of FIG. 1B than for that of FIG. 1A. FIGS. 2A, 3A and 4A are pictures taken of at least the eyes of three people with the camera of FIG. 1A. FIGS. 2B, 2C and 2D are pictures taken of at least the eye of the same three people with the camera of FIG. 1B. FIG. 2A clearly shows a lighter red than the eyes of the same person captured in FIG. 2B. The eyes also appear to be brighter n FIG. 2A than in FIG. 2B. FIG. 3A clearly shows a lighter red than the eyes of the same person captured in FIG. 3B. The eyes also appear to be brighter n FIG. 3A than in FIG. 3B. The right eye in FIG. 4A taken with the camera of FIG. 1A appears as a lighter red than the right eye of the same person in FIG. 4B taken with the camera if FIG. 1B. The left eye in FIG. 4A appears golden and very bright, while the left eye in FIG. 4B appears red and not nearly as bright as the left eye of FIG. 4A. The differences between the eyes captured in FIGS. 2A, 3A and 4A and those of FIGS. 2B, 3B and 4B is the different distances between the flashes and the optical lenses of the respective cameras used as illustrated at FIGS. 1A and 1B. Other features of the partial faces shown in FIGS. 2A and 2B do not appear to differ significantly, and same for FIGS. 3A-3B and 4A-4B.

Figure 5:
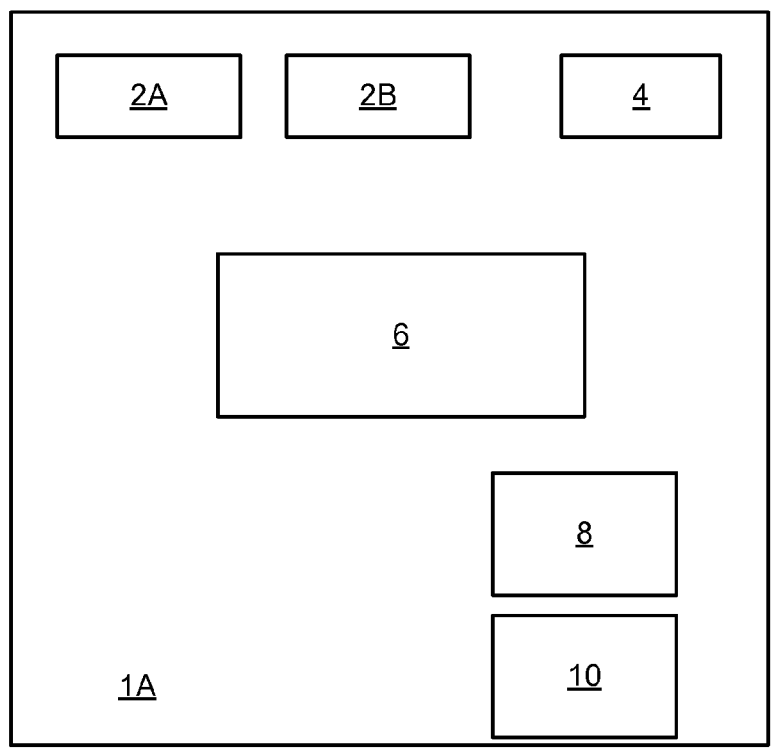
FIG. 5 illustrates a camera with two flashes separated at different distances from the camera's lens.

In accordance with certain embodiments, FIG. 5 schematically illustrates a camera with two distinct light sources 2a and 2b at different distances from a main lens 4. Two reference images, which may be preview, post-view and/or concurrent view images, are acquired using a low-intensity pre-flash from the two distinct flash units 2a, 2b. The camera illustrated schematically at FIG. 5 also includes a photosensor 6 such as a CMOS sensor aligned with lens 4 for digitally-capturing images including the preview images and main images intended to be stored, transmitted, displayed, projected, communicated and/or further processed. The camera also includes a processor 8 and one or more digital media 10 having program code stored therein. These media 10 and/or other media may be used to store image data as well. The camera can have other features such as one or more ports for connecting to another device such as a printer, PC, display device, another camera, phone, etc., with a cable or wirelessly, and/or for plugging in a flash card or other mountable device.

With the camera 1A illustrated schematically at FIG. 5, methods of detecting and corrected all kinds of defect eyes with high accuracy are provided on a digital flash camera. Certain embodiments take into greater account a red eye flash defect by concentrating on differences in color between the two preview or other reference images, while other embodiments take into greater account other defects such as golden eye, white eye, and/or zombie eye. The method is based on the effect of reflection from the eyes of the flash light to the CCD and/or CMOS of the camera. Such is a function of few parameters. That is, a defect eye distribution is a function of flash-lens positioning, distance to the subject, gaze angle, ambient lighting conditions, color of the iris, race, among other factors. The method of certain embodiments exploits variations of the defect eye distribution with the distance between the lens and the main light source of the camera (flash lamp, focusing LED, or any other source light).

The distribution of defects changes with the distance between the flash lamp and the lens, as does the character of the defects. The frequency of getting other than red defect eyes decreases with the increasing of the distance between the flash and lens. In addition, the intensity of the defect eyes decreases with the increasing of the distance between the flash and lens. For example, a distance between the first flash and the lens may be 2 cm, while the distance between the second flash and lens may be 5 cm. An optimal positioning of the two light sources 2a, 2b would provide a maximum difference between the distribution of the defect eyes on the two preview or other reference images, and a minimum difference between the rest of the preview images.

The two flash light sources may be identical light sources 2a, 2b, e.g., flash lamps, or two focusing lamps, or LEDs, on a same camera 1A at two different positions relative to the lens 4. The light sources may differ and the camera 1A would have software that would take the differences into account. However, the two identical light sources, except as to position relative to lens 4, provide two almost identical preview or other reference images. In this way, it is possible and optimal to get the difference map of the two previews.

The camera 1A is able to take two consecutive preview pictures, just before the final flash picture, or two post-view pictures, or one of each. The first preview or other reference image is taken with the first light source 2a of the camera 1A, and the second preview or other reference image is taken with the second light source 2b.

A difference map of the two preview or other reference images is generated. The differences could be determined in various ways, e.g., on the red channel only for detecting red eye defects, starting from the closer source light preview, or on the luminance channel only for white eye defects or golden eye defects.

A first source light 2a is preferably located very close to the lens 4 of camera 1A. For example, the light 2a may be 1 cm or 2 cm on the right or left side of the lens as illustrated at FIG. 1a. The second light source 2b may be on the right or left side of the lens 4 a longer distance such as 4 cm or 5 cm from the lens 4 such as illustrated at FIG. 2b. A first preview image may be captured using flash 2a, while a second preview image may be captured using flash 2b. Then the main image may be captured. As indicated, postview images may be captured instead. A difference map of the preview or postview images is calculated. The difference map is filtered to eliminate small differences, shadows, etc, and the significant differences that remain will be analyzed as probably or at least possible defect eyes subject to flash eye defect correction algorithm. The sources 2a, 2b may be in the simplest form two focusing lamps (e.g., LEDs) or in a complex form two flash lamps.

Figure 6:
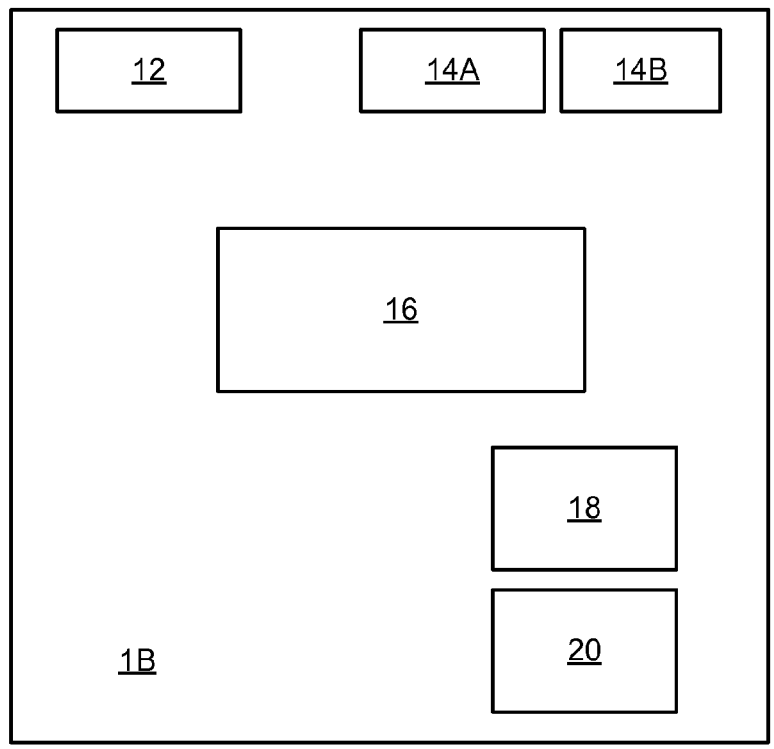
FIG. 6 illustrates a camera with two optical lenses separated at different distances from the camera's flash.

In accordance with further embodiments, FIG. 6 schematically illustrates a camera with a light source 12 and two distinct optical systems/lenses 14a and 14b at different distances from the flash 12. Two preview images may be acquired using a low-intensity pre-flash from the flash unit 12. The camera illustrated schematically at FIG. 6 also includes at least one photosensor 6 aligned with lenses 14a, 14b, e.g., two separate photosensors one for each lens 14a, 14b or a single sensor, for digitally-capturing images including the preview images and main images intended to be stored, transmitted, displayed, projected, communicated and/or further processed. The camera also includes a processor 18 and one or more digital media 20 having program code stored therein. These media 20 and/or other media may be used to store image data as well. The camera can have other features such as one or more ports for connecting to another device such as a printer, PC, display device, another camera, phone, etc., with a cable or wirelessly, and/or for plugging in a flash card or other mountable device.

In the embodiment of FIG. 6, a camera 1B has a single flash unit 12 and two imaging lenses 14a, 14b. A full dual imaging pipeline may be provided as well. In this embodiment, a first preview image is acquired using one of the imaging lenses 14a with a pre-flash illumination. At or near the same time, a second preview image is acquired using the second imaging lens 14b with illumination from the same weak pre-flash. The result is a pair of simultaneous preview images each being a different distance from the flash source. Any alignment errors will be solely due to geometrical factors rather than due to subject or camera movement and a compensation algorithm can be pre-calibrated.

The reference images captured using the different flashes 2a, 2b of the camera of FIG. 5, or with the two sensors 14a, 14b with the camera of FIG. 6, may then be compared, subtracted (with or without luminance normalizing) and/or otherwise analyzed. As only the eye regions will have very different characteristics, the locations of eye regions may be determined in this way. A third flash image may then be obtained using a full strength flash. This may be achieved by applying greater power to one of the flash units 2a, 2b, 12 or by combining the two flash units 2a, 2b together in the camera of FIG. 5, or otherwise such as by including a third flash.

Figure 7:
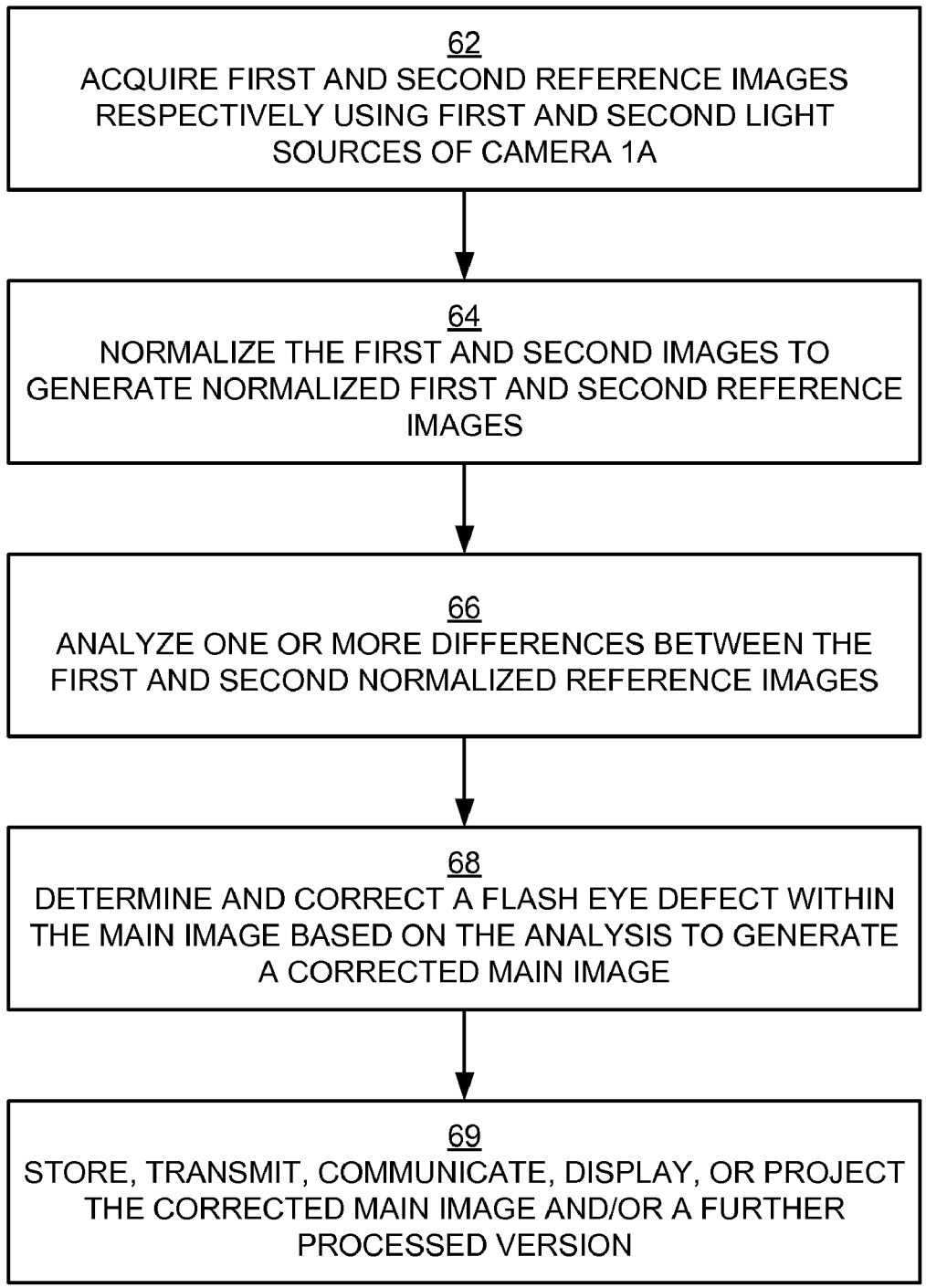
FIG. 7 is a block diagram illustrating a method in accordance with certain embodiments.

FIG. 7 illustrates a method involving the camera 1A of FIG. 5. First and second reference images are respectively acquired at 62 using the first and second light sources and optical system 4 of camera 1A of FIG. 5. The first and second images are normalized to generate normalized first and second reference images at 64. One or more differences between the first and second normalized reference images are analyzed at 66. A flash eye defect is determined and corrected within a main image based on the analyzing to generate a corrected main image at 68. The corrected main image and/or a further processed version is/are stored, transmitted, communicated, displayed, and/or projected at 69.

Figure 8:
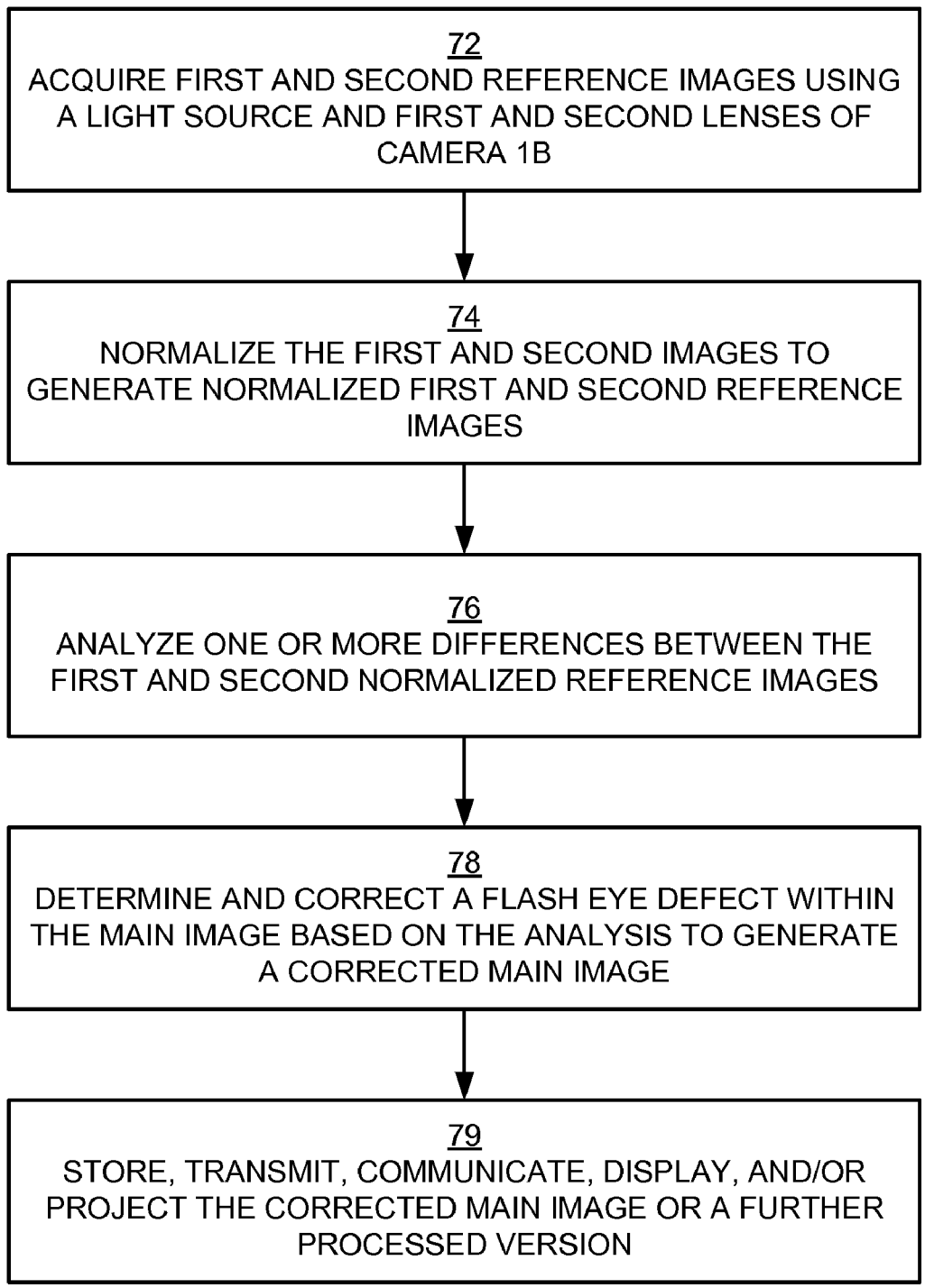
FIG. 8 is a block diagram illustrating a method in accordance with further embodiments.

FIG. 8 illustrates a method involving the camera 1B of FIG. 6. First and second reference images are acquired at 72 using a light source 12 and first and second lenses 14a, 14b of camera 1B of FIG. 6. First and second images are normalized at 74 to generate normalized first and second reference images. One or more differences between the first and second normalized reference images are analyzed at 76. A flash eye defect within the main image is determined and corrected based on the analysis to generate a corrected main image at 78. The corrected main image and/or a further processed version is/are stored, transmitted, communicated, displayed, and/or projected at 79.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the appended claims, and structural and functional equivalents thereof.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

In addition, all references cited above herein, as well as the background, invention summary, abstract and brief description of the drawings, are all incorporated by reference into the detailed description of the preferred embodiments as disclosing alternative embodiments. In addition, the following are incorporated by reference:

U.S. Pat. Nos. 6,407,777, 7,042,505, 7,352,394, 7,362,368, 7,269,292, 7,369,712, 6,035,072, 7,336,821, 7,315,631, and 7,295,233, United States published patent applications 2004/0223063, 2005/0041121, 2005/0140801, 2006/0120599, 2006/0093213, 2007/0116379, 2006/0039690, 2007/0116380, and 2007/0201724

U.S. patent applications Ser. Nos. 11/573,713, 11/462,035, 12/421,335, 11/761,647, 11/753,098, 12/038,777, 12/043,025, 11/752,925, 11/836,773, 11/767,412, 11/624,683, 60/945,558, 60/892,884, 11/861,257, 61/024,551, 11/937,377, and 61/023,855.

What is claimed is:

1. A portable digital image acquisition device, comprising:
   (a) a lens and a sensor for acquiring a main digital image and first and second reference images;
   (b) first and second light sources disposed at different distances from the lens for illuminating one or more objects within an acquired scene;
   (c) a memory for storing the main digital image;
   (d) one or more non-transitory processor-readable media having digital code embedded therein for programming a processor to perform a method of determining and correcting a flash eye defect in the main digital image using the first and second reference images, wherein the method comprises:
      (i) acquiring the first and second reference images respectively using the first and second light sources;
      (ii) normalizing the first and second reference images to generate normalized first and second reference images;
      (iii) analyzing one or more differences between the first and second normalized reference images;
      (iv) determining and correcting the flash eye defect within the main image based on the analyzing to generate a corrected main image; and
      (v) storing, transmitting, communicating, displaying, or projecting the corrected main image or a further processed version, or combinations thereof.

2. The device of claim 1, wherein the analyzing comprises subtracting the first and second reference images.

3. The device of claim 1, wherein the normalizing comprises luminance normalizing.

4. The device of claim 1, wherein the flash eye defect comprises a red eye defect.

5. The device of claim 1, wherein the normalizing comprises re-sizing one or both of the first and second reference images.

6. The device of claim 1, wherein the normalizing comprises aligning the first and second reference images.

7. The device of claim 6, wherein the aligning comprises aligning one or more eyes within the first and second images.

8. The device of claim 1, wherein the differences comprise color differences.

9. The device of claim 1, wherein the differences comprise brightness differences.

10. The device of claim 1, wherein the first and second reference images are each acquired using relatively low-intensity pre-flashes compared with an intensity of a flash used in acquiring the main digital image.

11. The device of claim 1, wherein the analyzing takes into account the specific different distances from the lens of the first and second light sources.

12. The device of claim 11, wherein the analyzing further takes into account distance to one or more objects, a gaze angle, an ambient lighting condition, color of an iris or a skin tone of a face within the acquired scene, or combinations thereof.

13. The device of claim 1, wherein the first and second preview images are acquired consecutively prior to acquiring the main digital image.

14. A method of determining and correcting a flash eye defect in a main digital image using first and second reference images, wherein the method comprises using a processor-based digital image acquisition device to perform the following:
   acquiring first and second reference images respectively using first and second light sources disposed at different distances from a camera lens;
   normalizing the first and second reference images to generate normalized first and second reference images;
   analyzing one or more differences between the first and second normalized reference images;
   determining and correcting a flash eye defect within the main image based on the analyzing to generate a corrected main image; and
   storing, transmitting, communicating, displaying, or projecting the corrected main image or a further processed version, or combinations thereof.

15. The method of claim 14, wherein the analyzing comprises subtracting the first and second reference images.

16. The method of claim 14, wherein the normalizing comprises luminance normalizing.

17. The method of claim 14, wherein the flash eye defect comprises a red eye defect.

18. The method of claim 14, wherein the normalizing comprises re-sizing one or both of the first and second reference images.

19. The method of claim 14, wherein the normalizing comprises aligning the first and second reference images.

20. The method of claim 19, wherein the aligning comprises aligning one or more eyes within the first and second images.

21. The method of claim 14, wherein the differences comprise color differences.

22. The method of claim 14, wherein the differences comprise brightness differences.

23. The method of claim 14, wherein the first and second reference images are each acquired using relatively low-intensity pre-flashes compared with an intensity of a flash used in acquiring the main digital image.

24. The method of claim 14, wherein the analyzing takes into account the specific different distances from the lens of the first and second light sources.

25. The method of claim 24, wherein the analyzing further takes into account distance to one or more objects, a gaze angle, an ambient lighting condition, color of an iris or a skin tone of a face within the acquired scene, or combinations thereof.

26. The method of claim 14, wherein the first and second preview images are acquired consecutively prior to acquiring the main digital image.

27. One or more non-transitory processor-readable media having digital code embedded therein for programming a processor to perform a method of determining and correcting a flash eye defect in a main digital image using first and second reference images acquired with first and second light sources respectively disposed different distances from a camera lens, wherein the method comprises:
   normalizing the first and second reference images to generate normalized first and second reference images;
   analyzing one or more differences between the first and second normalized reference images;
   determining and correcting the flash eye defect within the main image based on the analyzing to generate a corrected main image; and
   storing, transmitting, communicating, displaying, or projecting the corrected main image or a further processed version, or combinations thereof.

28. The one or more media of claim 27, wherein the analyzing comprises subtracting the first and second reference images.

29. The one or more media of claim 27, wherein the normalizing comprises luminance normalizing.

30. The one or more media of claim 27, wherein the flash eye defect comprises a red eye defect.

31. The one or more media of claim 27, wherein the normalizing comprises re-sizing one or both of the first and second reference images.

32. The one or more media of claim 27, wherein the normalizing comprises aligning the first and second reference images.

33. The one or more media of claim 32, wherein the aligning comprises aligning one or more eyes within the first and second images.

34. The one or more media of claim 27, wherein the differences comprise color differences.

35. The one or more media of claim 27, wherein the differences comprise brightness differences.

36. The one or more media of claim 27, wherein the first and second reference images are each acquired using relatively low-intensity pre-flashes compared with an intensity of a flash used in acquiring the main digital image.

37. The one or more media of claim 27, wherein the analyzing takes into account the specific different distances from the lens of the first and second light sources.

38. The one or more media of claim 37, wherein the analyzing further takes into account distance to one or more objects, a gaze angle, an ambient lighting condition, color of an iris or a skin tone of a face within the acquired scene, or combinations thereof.

39. The one or more media of claim 27, wherein the first and second preview images are acquired consecutively prior to acquiring the main digital image.

* * * * *